United States Patent

Burgess, Jr.

[15] 3,635,324
[45] Jan. 18, 1972

[54] VIBRATORY EXIT CHUTE

[72] Inventor: Warren C. Burgess, Jr., Avon Lake, Ohio

[73] Assignee: Burgess & Associates, Inc.

[22] Filed: Mar. 9, 1970

[21] Appl. No.: 17,733

[52] U.S. Cl. ...................198/33 AA, 198/59, 198/220 BA, 198/DIG. 12
[51] Int. Cl. .....................................B65g 47/24, B65g 45/00
[58] Field of Search..............198/DIG. 12, 33.1, 59, 220 BA; 193/32; 221/172

[56] References Cited

UNITED STATES PATENTS

| | | | |
|---|---|---|---|
| 2,595,065 | 4/1952 | Erasic | 221/172 |
| 3,120,890 | 2/1964 | Waltz | 198/33.1 |
| 2,549,322 | 4/1951 | McKinsey | 198/33.1 |
| 2,050,774 | 8/1936 | Wilcox | 193/32 X |
| 3,023,738 | 3/1962 | Burgess, Jr. | 198/220 BA |

FOREIGN PATENTS OR APPLICATIONS

| | | | |
|---|---|---|---|
| 1,130,602 | 10/1968 | Great Britain | 198/33.1 |

*Primary Examiner*—Evon C. Blunk
*Assistant Examiner*—Hadd S. Lane
*Attorney*—McNenny, Farrington, Pearne & Gordon

[57] ABSTRACT

There is provided an improved vibratory parts handling method and apparatus characterized by a return baffle chute carried on a resilient supporting and guiding means, for example a flat spring or springs, and having vibration-inducing means adapted and disposed for vibrating the chute. The apparatus and method are especially useful in the handling of axial lead electrical circuit elements, e.g., resistors having axially extending wire leads.

18 Claims, 3 Drawing Figures

PATENTED JAN 18 1972

3,635,324

INVENTOR
WARREN C. BURGESS, JR.

McNenny, Farrington, Pearne & Gordon
ATTORNEYS

VIBRATORY EXIT CHUTE

BACKGROUND OF THE INVENTION AND PRIOR ART

The present invention relates, as indicated, to a method and apparatus which is especially useful in the handling of small parts, particularly elements useful in electrical circuits, for example resistors, diodes, condensers, and the like, which are characterized by a central element portion, usually cylindrical in configuration and having oppositely axially extending wire leads projecting therefrom. The present invention will be described, therefore, with reference to axial lead electrical components, it being understood that other parts which it is desired to handle in a side-by-side rolling attitude may be handled by the apparatus as well. In this attitude, the parts are moving in a direction generally perpendicular to their longitudinal axes.

The return baffle exit chute as it will hereinafter be identified is a device well known to the trade for use in achieving and maintaining orientation of axial lead-type electrical parts in a rolling attitude in side-by-side relation. These chutes are characterized by a plurality of baffle members extending inwardly from opposite marginal regions in a spaced interleafed fashion whereby parts introduced at one end of the hopper for traverse through the chute are caused to cascade in a zigzag manner by impingement upon successive downwardly pitched baffle plates. The baffles in such chutes are generally curved to aid in the achievement of a rolling side-by-side orientation by the time the parts exit from the bottom of the return baffle chute system. Such chutes may be placed at the exit of vibrating parts feeding bowls, for example, to receive parts moving in a generally axial direction into the mouth of the chute. Then by means of the curved spaced interleafed baffles, the parts achieve a side-by-side orientation and move in a direction perpendicular to their respective axis. Thus, the parts undergo a transition in direction of movement and in mode of alignment or orientation. The speed at which this transition can be made to occur is a limiting factor with current systems.

Such chutes have been used in the past for feeding such parts into trimming, lead straightening, forming, and otherwise processing equipment for the performance of such indicated operations. Such equipment may be adapted to handle axial lead components at rates in excess of 200 to 400 units per minute. The conventional return baffle exit chute in which the aforementioned transition occurs, however, tends to clog up and operate inefficiently when parts are fed by the usual vibratory means into the mouth or inlet of the chute at rates exceeding 100 to 150 parts per minute. Thus the capacity of the chute to feed parts limits the rate at which processing equipment may be utilized event though such equipment is capable of a much higher capacity. For short periods of time, feed rates through the chute system of the order of 150 to 200 parts per minute can be achieved on an experimental basis where the parts are metered in a precisely controlled or nearly precisely controlled uniform manner instead of the usual random manner in terms of parts per unit of time. However, if any bunching of the parts entering the return baffle chute system occurs as is common with most vibratory feeding apparatus, the chute invariably becomes clogged within a short time. Clogging results in shutting down the processing equipment.

It was found that if the return baffle section is mounted on a resilient spring system together with a vibratory drive means, a chute previously capable of handling no more than about 150 parts per minute under controlled feeding conditions may be made to operate at a rate substantially in excess of 150 parts per minute. Moreover, this rate may be achieved with the parts being fed into the chute at a high rate and in a random fashion with no particular pains being taken to achieve a precisely uniform metering of parts into the upper portion or entrance of the chute. An entrance chute may be integral with or separate from the baffle apparatus. Also, a short length of exit track may be integral with or separate from the baffle chute apparatus. Still further, utilizing a vibratory drive means, or vibration-inducing device, of the pneumatic free-piston type, which is adapted to permit control of frequency and amplitude in a substantially independent manner, contributes to a fivefold increase in parts handling rate experienced with embodiments of the apparatus herein described. It was found that relatively large amplitudes of vibration of the chute as a whole at medium to high frequencies enable increases in delivery rate of this order. These amplitudes range between about 0.015 inch and 0.250 inch, and the frequency is between about 3,000 and 8,000 cycles per minute. Once the high-speed parts feed rate has been achieved for more than a few minutes, merely shutting down the vibratory action results in a almost immediate jamming of the return baffle chute, and cessation of feeding of parts.

Until the advent of this type of equipment, it was becoming entirely necessary for all axial lead components for the electronic industry to be placed in special containers, cartridges, or on tape for use on automatic assembly or testing equipment in order to achieve the high capacity built into the processing equipment. This is a very extensive process equipment in order to achieve the high capacity built into the processing equipment. This is a very expensive process and adds materially to the cost of electronic components. By means of devices in accordance with the present invention especially when utilized in combination with a disentangling device for separating entangled parts as described in my copending application Ser. No. 835,096 filed June 20, 1969, and utilizing as the vibration-inducing apparatus for the return baffle chute a pneumatic free-piston vibration-inducing drive and a power control system therefore as described in my U.S. Pat. No. 3,023,738 dated Mar. 6, 1962, it is possible for the first time to achieve dependably feed rates in excess of 200 parts per minute while handling the axial lead parts from a bulk supply of such parts. When such axial lead component parts are received from the manufacturer, they are usually greatly entangled. Apparatus such as described in my aforesaid Ser. No. 835,096 may be used to disentangle such parts and supply them by means of the return baffle chute herein described at much higher rates.

In the aforesaid Ser. No. 835,096, there has been described a vibratory parts feeding device capable of feeding parts singly and in rapid succession including a vibratable receptacle and having means for vibrating the receptacle such as a pneumatic free-piston vibration-inducing device for conveying parts in a predetermined orientation. The receptacle is a bowllike structure having a bottom and an upstanding wall, and a peripheral inclined parts-conveying trackway on the wall for elevating parts from the bottom to a discharge point adjacent the upper marginal edge of the bowl. When associated with the apparatus of the present invention, the discharge leads into the entrance chute hereinafter more particularly described. An upstanding centrally located crown member is provided and is secured to the bottom of the bowl-type receptacle. It is vibratable together with the bowl. Also provided is a generally circular funnel-form hopper for supplying parts to the bowl which hopper is concentrically disposed above the bowl and defines together with the crown member an annular slot dimensioned to pass disentangled parts from the hopper into the bowl. To aid in disentangling the parts there is provided a disentangling platform concentrically disposed within the hopper and having a hub and a plurality of radial spokes extending from the hub toward the walls of the hopper. The space between adjacent spokes is insufficiently sized to pass a mass of entangled parts, but sufficiently sized to pass individual disentangled parts. The crown member is fitted with an apertured pedestal and has associated with it a pneumatically operable concentrically disposed piston and cylinder, the cylinder being secured to the pedestal. The piston is provided with a rod extending beyond the cylinder and free through the aperture in said pedestal for operative axial engagement with the hub so that the hub may be selectively moved into and out of contact with the pedestal in response to movement of the piston in the cylinder. Thus, when the hub is in contact with the pedestal, and the entire assembly is being vibrated by means of the vibration-inducing device, then the hub, the radiating spokes and the entangled mass of parts supported thereon is vibrated and individual parts released. When the piston cylinder assembly is operated to move the hub out of contact with the pedestal, vibration of the hub and radiating spokes together with the mass of parts ceases or is greatly diminished and the release of individual parts into the bowl stopped or nearly so. Means responsive to the supply of parts within the bowl may be supplied for controlling the supply of air or other fluid to the piston cylinder assembly so that the provision of disentangled parts to the vibrating bowl may be controlled.

Thus, parts are supplied from such an apparatus in substantially end-to-end or axial alignment, and are collected from the discharge extremity of the track at the upper marginal edge of the bowl and introduced by means of an entrance chute into the apparatus of the present invention.

BRIEF STATEMENT OF THE INVENTION

Briefly stated, therefore, the present invention is in the provision of a method and apparatus for handling elongated parts, e.g., axial lead electrical circuit components, and changing their orientation from a generally end-to-end relationship to a side-by-side attitude and their direction of movement from a generally axial direction to a direction perpendicular to the longitudinal axis of the individual parts. The apparatus comprises in combination a return baffle chute of conventional structure, a base, and means coacting between the chute and the base fore supporting and guiding said chute for to and fro movement along a confined path. Means are provided, then, for imparting vibratory motion to said chute whereby the chute is oscillated along the confined path at a predetermined frequency and at a predetermined amplitude of vibration. For best results, the path of oscillation lies in a plane which is perpendicular to the surfaces of the baffles in the return baffle chute.

DETAILED DESCRIPTION OF THE DRAWINGS

Figures 1, 2, 3:
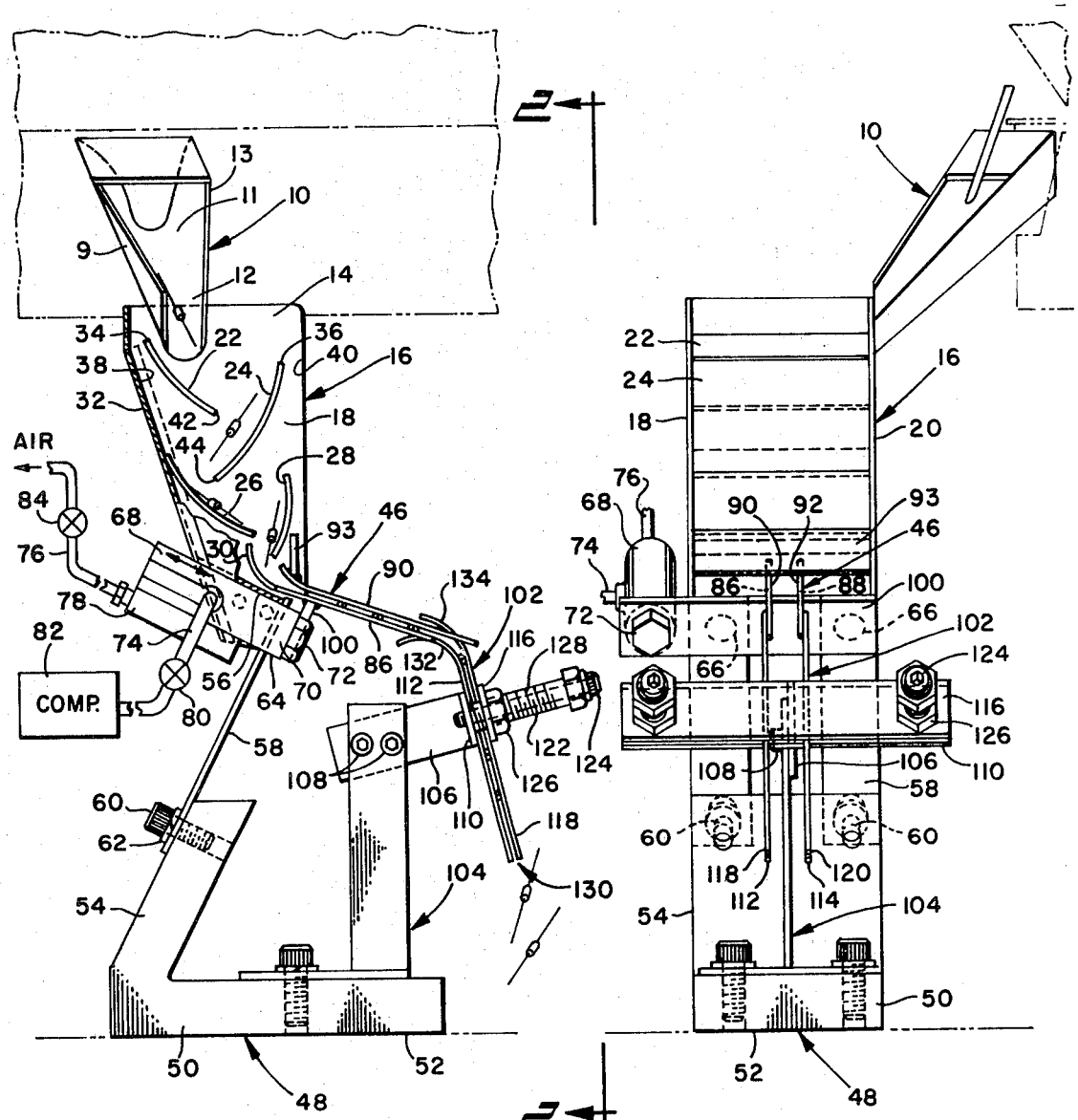
FIG. 1 is a side elevation of a vibratory exit chute in accordance herewith showing a return baffle chute, a base, and resilient support and guide means coacting between the base and the chute and also showing a pneumatic vibration-inducing device for imparting vibratory motion to the chute.
FIG. 2 is a front elevation of the apparatus as it appears in the plane indicated by the line 2—2 in FIG. 1.
FIG. 3 is an illustration of an electrical component having axial leads, e.g., a resistor.

Referring now more particularly to FIGS. 1 and 2, there is here shown an entrance chute generally indicated at 10 for receiving parts moving in a generally axial direction and in generally end-to-end attitude from a vibratory parts feeding apparatus preferably associated with disentangling means such as shown in my aforesaid Ser. No. 835,096 and briefly described above. A discharge opening 12 of the entrance chute 10 leads from a sloping generally U-shaped trough 11 having diverging sidewalls 9 and 13 to the mouth 14 of a return baffle chute 16. The return baffle chute 16 has a rectangular cross section and is provided with a pair of sidewalls 18 and 20 held in spaced parallel relation by return baffles 22, 24, 26, 28 and 30. The spacing between sidewalls 18 and 20 is adequate to admit freely the axial lead parts. Discharge opening 12 is located above baffle plate 22 to launch parts onto the first baffle plate. There need be no front or rear walls of the chute 16 although it is convenient to provide a rear panel 32. The sidewalls 18 and 20, the baffles and the rear panel may be formed of sheet metal. The entrance chute 10 may also be formed of sheet metal, and may be integral with the sidewall 20 as by being welded or soldered thereto.

As indicated above, the baffle members 22, 24, 26, 28 and 30 are conveniently curved in a geometric configuration like axially extending segments of a hollow cylinder. One, some or all may include a central depression or recess, or be cut out to accommodate the part body, e.g., part body 94 in FIG. 3. Although a circular contour is shown, the contour may be parabolic or hyperbolic, or a mixture of such spaces, as may be desired. Alternatively, the baffle plates may be flat. The curved sections are preferred, however, because acceleration of the parts along a curved surface tends to align the parts with an element (geometrically speaking of the surface. The baffles 22—20 are disposed with their upper marginal edges, for example upper marginal edges 34 and 36, adjacent the lateral marginal edges 38 and 40, respectively, of the return baffle chute 16. The lower inwardly disposed marginal edges, for example lower marginal edges 42 and 44, are disposed in spaced interleafed relation so as to obstruct a free path through the chute body 16. Thus, parts entering the mouth 14 of the return baffle chute 16 through the entrance chute 10 are cascaded in a zigzag fashion from the curved surface of the baffle 22 onto the curved surface of baffle 24, thence onto the curved surface of the baffle 26, impinged against the curved surface of baffle 28 and bounced to the curved surface of the baffle 30 from which point it exits to a discharge track 46. In the embodiment shown, the baffle 30 is cut out in the central portion so that the axial lead part (FIG. 3) may be supported solely by the leads for easy introduction onto the discharge track 46. The remaining baffles 22, 24, 26 and 28 are continuous between the sidewalls 18 and 20. It will be observed that the angle of declination increases as the baffles approach the exit extremity of the chute. This disposition aids in promoting acceleration of the parts as they fall through the baffle chute 16, which acceleration is useful in achieving parallel alignment of the axial lead parts by the time they reach the discharge track 46. The apparatus is mounted on a base generally indicated at 48. In the embodiment shown, the base is composed of an angular bracket 50 having a laterally extending foot portion 52 and an upstanding portion 54 disposed at an angle of about 60° to the horizontal. Desirably, the foot portion 52 is adapted to be securely mounted on a suitable support preferably of relatively high mass. A solid crossmember 56 extends between the sidewalls 18 and 20 and provides an anchor for supporting the baffle chute 16. Coacting between upstanding portion 54 of base 48 and the solid crossmember 56 within the body of the return baffle chute 16 is a supporting and guiding leaf-type spring 58 suitably fastened as by bolt 60 and lock washer 62 to the upstanding portion 54 and by means of crosshead 64 suitably fastened to the solid cross member 56 as by means of bolt 66. In the embodiment shown in FIGS. 1 and 2, two springs 58 are provided. While these may be standard leaf-type steel springs, best results are secured by utilizing fiber glass-reinforced epoxy resin springs of conventional composition. The function of the spring members 58 in addition to supporting the baffle chute 16 and guiding it in an oscillatory manner along a confined path is to store and release energy imparted by a vibration-inducing device. Any kind of vibration-inducing device whether electromagnetic, mechanical, or pneumatic may be used as the drive means for imparting vibratory energy to the system. A pneumatically driven vibration-inducing device is preferred for reasons hereinafter set forth.

In the embodiment shown in FIG. 1, there is provided a pneumatic free-piston vibration-inducing device 68 secured to an extension 70 of the crosshead 64 as by a bolt 72. The vibrator 68 is a free-piston device of the type shown in detail in FIG. 2 of may aforesaid U.S. Pat. No. 3,023,738, or my U.S. Pat. No. 2,861,548. The piston (not shown) oscillates in the directions indicated by the arrow. A compressed gas, e.g., compressed air, is introduced into the apparatus through an inlet line such as air line 74 and exhausts through exit line 76. A common header 78 collects spent gas from both sides of the piston cylinder arrangement, combines the exhausts from such sides (not shown) and exits the exhaust gas through the line 76. As detailed in my aforesaid U.S. Pat. No. 3,023,738, the disclosure of which is incorporated herein by reference, the frequency of vibration is conveniently controlled by means of a pressure control valve 80 in the air line 74 leading from an air compressor 82. Air filters (not shown in the more diagrammatic air system portion of FIG. 1) may be used if desired. The spent gas or exhaust collected by header 78 and vented through exhaust line 76 passes through a control valve 84 which controls the pressure drop of the compressed gas through the apparatus in the manner detailed in U.S. Pat. No. 3,023,738. By regulating the inlet pressure with control valve 80, the frequency of vibration induced in the baffle chute may be controlled. Moreover, by controlling the pressure drop through the pneumatic free-piston vibration-inducing device with the control valve 84, the amplitude of vibration may be controlled substantially independently of the frequency of vibration. The ability to control these parameters simply and substantially independently one of the other is unique to pneumatically driven free-piston vibration-inducing devices and of particular utility in the handling of axial lead component parts (see FIG. 3) at extremely high rates of feed relative to that which has heretofore been achieved.

FIG. 3 shows a typical axial lead electrical circuit component, e.g., a resistor. Axial leads 96 and 98 extend in an axial direction from resistor body 94.

As indicated above, the preferred embodiment of the apparatus illustrated in FIGS. 1 and 2 also includes a discharge track assembly 46, preferably proceeding in the same direction as the path of oscillation of the free piston in vibration-inducing device 68 (see direction of arrow in FIG. 1 on 68). This device conveniently includes a pair of spaced lower rails 86 and 88, and a pair of upper spaced rails 90 and 92. A support bar 93 extending between sidewalls 18 and 20 supports upper rails 90 and 92 which are secured thereto as by welding. This may be made adjustable if desired to account for differences in lead diameter, for example. The lateral spacing of the upper and lower rails is conveniently determined to be large enough to freely pass the component element portion such as the resistor body 94. The vertical spacing between lower and upper rails 86 and 90, for example, is sufficient to pass the axial lead portions 96 and 98. The discharge track 46 is conveniently supported from the crosshead 64 as by support 100 suitably welded to the discharge track 46 and to the crosshead 64.

Lower vibrating rails 86 and 88 and upper vibrating rails 90 and 92 are each secured either directly or indirectly to the return baffle chute and accordingly vibrate with the chute 16. To recover the parts in aligned, side-by-side manner from the vibrating apparatus, there is conveniently provided an adjustable stationary guide portion generally indicated at 102. The guide 102 is conveniently supported on a pedestal 104 of any convenient structure and having a laterally extending arm 106 bolted thereto as by bolts 108. Arm 106 carries at its distal extremity a crosshead 110 to which lower stationary rails 112 and 114 are secured as by welding. The lower rails 112 and 114 at the point of transition from lower vibrating rails 86 and 88 are desirably tangential thereto. Adjustable crosshead 116 is provided to which are secured as by welding upper rails 118 and 120. A sleeve bolt 122 is secured by coaxially disposed bolt 124, which is threadedly engaged with the crosshead 110. The jam nut 126 coacts with the threaded portion 128 of sleeve bolt 122 which is in turn threadedly engaged with crosshead 116 to permit adjustment of the space 130 between the upper rails 118 and 120 and the lower rails 112 and 114. The lateral spacing of the upper rails 118 and 120 and the lateral spacing of the lower rails 112 and 114 is determined by the width of the component element 94 and is adjusted to be slightly larger so as to freely accommodate these parts. The axial lead portions 96 and 98 pass freely through the gap 130.

The upper extremity of the stationary guide 102 is provided with curved portions 132 and 134 which coact with the vibrating discharge track assembly 46 to accept the parts being fed therethrough. The parts exit from the discharge track 46 and the lower extremity of the stationary guide 102 rolling on the laterally extending axial leads 96 and 98. The parts as discharged are then in condition for introduction into further processing equipment, for example straightening, installing, or otherwise utilizing the parts. The design and construction of the discharge means will depend to a large extent on the operations to be performed after the transition in direction of movement and orientation has been achieved by the vibratory baffle chute 16. A convenient frequency of vibration is 4,000 to 6,000 cycles per minute and a convenient amplitude of vibration is 0.125 inch. The device may be operated at an inlet pressure of from 15 to 150 p.s.i.g., e.g., 60 p.s.i.g., and the pressure drop through the apparatus may be on the order of from 2 to 50 p.s.i.g. Within these limits, increases in capacity for handling axial lead-type parts from 2 to 5 times the capacity of conventional apparatus which is stationarily mounted have been achieved.

The discharge guide apparatus shown in FIGS. 1 and 2 incorporates a principle which is adaptable not only to coaction with the vibratory exit chute of the present invention, but also with other vibratory parts conveying apparatus, and especially those from which elongated parts issue in parallel juxtaposed relation. As indicated above, the discharge guide apparatus includes a vibratable section secured to and adapted to vibrate with the vibratory conveyor and defining a support surface for the part being conveyed. This support surface may be configured to accommodate the geometric shape of the part being handled. In the present case, therefore, the configuration is formed by upper and lower pairs of laterally spaced parallel rails in the vibratable section and, in the stationary section upper and lower pairs of laterally spaced parallel rails. The upper surface of the lower spaced parallel rails of both the vibratable section and the stationary section form surfaces which support the part being conveyed. The upper spaced parallel rails of both the vibratable and stationary sections act primarily as guides to prevent escape of the parts. In the embodiment shown, the stationary section is angularly related to the vibratable section and communicates therewith through a curved transition surface formed by portions 132 and 134. The curved portions 132 define a part-supporting surface which is tangential to the parts-supporting surface defined by the parallel rails 86 and 88 of the vibratable section. In order to overcome substantially entirely "hangup" of the parts in the transition portion from the vibratable to the stationary section, the joinder of the two sections should be in respect of the supporting surfaces tangentially related.

What is claimed is:

1. A vibratory exit chute for handling elongated parts comprising in combination:
   a. a return baffle chute, including a pair of sidewalls spaced apart a distance greater than the length of said elongated parts and a plurality of baffle plates having parallel concavely arranged elements of curvature extending between said sidewalls and alternately inwardly extending from opposite marginal edges of said sidewalls a distance sufficient to provide an obstructed path through the chute, whereby elongated parts cascading through the chute tend to align their axes parallel to said elements;
   b. a base,
   c. means coacting between said chute and said base for supporting and guiding said chute along a confined path, substantially normal to said elements and
   d. means for imparting vibratory motion to said chute for movement along said confined path.

2. A vibratory exit chute in accordance with claim 1 wherein the baffle plates each have the general configuration of a section of a hollow cylinder.

3. A vibratory exit chute in accordance with claim 1 wherein the chute includes means adjacent its discharge extremity guide for conducting parts away from said chute.

4. A vibratory exit chute is accordance with claim 1 wherein the chute has a rectangular cross-sectional configuration.

5. A vibratory exit chute in accordance with claim 1 wherein the supporting and guiding means includes a flat spring.

6. A vibratory exit chute in accordance with claim 5 wherein the flat spring is a fiberglass-reinforced resinous spring.

7. A vibratory exit chute in accordance with claim 5 wherein the means for imparting vibratory motion of the chute includes a pneumatic free-piston vibration-inducing device.

8. A vibratory exit chute in accordance with claim 7 in which the free piston of the free-piston vibration-inducing device oscillates on an axis lying in a plane which is substantially normal to the plane including the longitudinal axis of the flat spring.

9. A vibratory exit chute in accordance with claim 7 in which the means for imparting vibratory motion to the chute includes means for varying the frequency of vibration of the pneumatic free-piston vibration-inducing device.

10. A vibratory exit chute in accordance with claim 7 in which the means for imparting vibratory motion to the chute includes means for varying the amplitude of vibration of the pneumatic free-piston vibration-inducing device.

11. A vibratory exit chute in accordance with claim 7 in which the means for imparting vibratory motion to the chute includes means for varying the frequency of vibration and means for varying the amplitude of vibration of the pneumatic free-piston vibration-inducing device.

12. A vibratory exit chute in accordance with claim 1 in which the return baffle chute includes guide means for the parts exiting from said chute, said guide means being secured at one end to said chute.

13. A vibratory exit chute in accordance with claim 12 in which the guide means includes a vibratable section attached to the chute and a substantially stationary section coacting therewith to receive parts therefrom.

14. A vibratory exit chute in accordance with claim 13 in which the stationary section coacts with the vibratable section through a flared mouth portion adapted to receive parts therethrough.

15. A vibratory exit chute in accordance with claim 14 in which the vibratable section includes upper and lower pairs of laterally spaced parallel rails, and the lower stationary section includes upper and lower pairs of laterally spaced parallel rails, the lower vibratable rails and lower stationary rails having part-engaging surfaces which are tangentially related in the flared mouth portion.

16. A method for feeding elongated parts to align their axes parallel to each other which comprises the steps of passing said parts serially downwardly from one concave baffle plate having parallel concavely arranged elements of curvature to a succeeding oppositely arranged concave baffle having parallel concavely arranged elements of curvature in an attitude substantially parallel to said elements of curvature, and oscillating said baffles along a confined path normal to said elements of curvature at a predetermined frequency and a predetermined amplitude of vibration whereby said elongated parts cascading over said baffles tend to align their axes parallel to said elements.

17. A method in accordance with claim 16 wherein the path of oscillation lies in a plane normal to the surface of the baffles.

18. A method in accordance with claim 16 which also includes the step of accelerating the parts across successively downwardly cascading curved surfaces.

* * * * *